(12) United States Patent
Backhouse et al.

(10) Patent No.: US 11,187,084 B2
(45) Date of Patent: Nov. 30, 2021

(54) METHOD OF MANUFACTURING A FAN BLADE AND A FAN BLADE

(71) Applicant: ROLLS-ROYCE plc, London (GB)

(72) Inventors: Robert C Backhouse, Wells (GB); Vincent Gill, Bristol (GB)

(73) Assignee: ROLLS-ROYCE plc, London (GB)

( * ) Notice: Subject to any disclaimer, the term of this patent is extended or adjusted under 35 U.S.C. 154(b) by 337 days.

(21) Appl. No.: 16/277,402

(22) Filed: Feb. 15, 2019

(65) Prior Publication Data
US 2019/0308376 A1    Oct. 10, 2019

(30) Foreign Application Priority Data

Apr. 4, 2018  (GB) ...................... 1805546
Apr. 4, 2018  (GB) ...................... 1805547

(51) Int. Cl.
*B29C 70/30*     (2006.01)
*F01D 5/14*      (2006.01)
(Continued)

(52) U.S. Cl.
CPC ............. *F01D 5/147* (2013.01); *F01D 5/282* (2013.01); *B29C 70/081* (2013.01); *B29C 70/12* (2013.01);
(Continued)

(58) Field of Classification Search
CPC ............. B29D 99/0025; B29L 2031/08; B29L 2031/082; B29C 70/345; B29C 70/30;
(Continued)

(56) References Cited

U.S. PATENT DOCUMENTS 2,859,936 A    11/1958  Warnken
3,132,841 A    5/1964   Wilder
(Continued)

FOREIGN PATENT DOCUMENTS

EP    0 465 169 A1    1/1992
EP    1 930 548 A2    6/2008
(Continued)

OTHER PUBLICATIONS

U.S. Appl. No. 16/277,494, filed Feb. 15, 2019 in the name of Gill.
(Continued)

*Primary Examiner* — Courtney D Heinle
*Assistant Examiner* — Danielle M. Christensen
(74) *Attorney, Agent, or Firm* — Oliff PLC

(57) ABSTRACT

A method of manufacturing a fan blade for a gas turbine engine. The method includes providing a compression mould having an internal mould surface corresponding to an outer profile of a fan blade, providing opposing first and second laminates to form a shell corresponding to the mould surface, each laminate comprising a lay-up of plies of fibre reinforcement material, applying a core material comprising quasi-isotropic short fibre reinforced resin in the compression mould so that with the compression mould in a moulding configuration the core material is enclosed by the shell, the core material and the shell forming a pre-form for the fan blade, applying pressure to compress the pre-form so that it conforms to the mould surface, and applying heat to cure the pre-form.

20 Claims, 7 Drawing Sheets

(51) Int. Cl.

| | |
|---|---|
| *F01D 5/28* | (2006.01) |
| *B29C 70/36* | (2006.01) |
| *B29C 70/54* | (2006.01) |
| *B29C 70/70* | (2006.01) |
| *B29L 31/08* | (2006.01) |
| *B32B 1/00* | (2006.01) |
| *B32B 5/06* | (2006.01) |
| *B32B 5/26* | (2006.01) |
| *B32B 38/00* | (2006.01) |
| *B32B 38/18* | (2006.01) |
| *B29C 70/08* | (2006.01) |
| *B29C 70/12* | (2006.01) |
| *B29C 70/34* | (2006.01) |
| *B29C 70/68* | (2006.01) |
| *B29D 99/00* | (2010.01) |

(52) U.S. Cl.
CPC ............ *B29C 70/30* (2013.01); *B29C 70/345* (2013.01); *B29C 70/36* (2013.01); *B29C 70/54* (2013.01); *B29C 70/682* (2013.01); *B29C 70/70* (2013.01); *B29D 99/0025* (2013.01); *B29L 2031/08* (2013.01); *B29L 2031/082* (2013.01); *B32B 1/00* (2013.01); *B32B 5/06* (2013.01); *B32B 5/26* (2013.01); *B32B 38/0012* (2013.01); *B32B 38/1808* (2013.01); *B32B 2250/20* (2013.01); *B32B 2255/02* (2013.01); *B32B 2255/26* (2013.01); *B32B 2305/076* (2013.01); *B32B 2603/00* (2013.01); *F05D 2220/32* (2013.01); *F05D 2230/40* (2013.01); *F05D 2300/44* (2013.01); *F05D 2300/603* (2013.01); *F05D 2300/6034* (2013.01); *F05D 2300/611* (2013.01)

(58) Field of Classification Search
CPC ... B29C 70/682; B29C 70/54; B32B 2603/00; F01D 5/147; F01D 5/282; F05D 2230/40; F05D 2300/44; F05D 2300/603; F05D 2300/6034
See application file for complete search history.

(56) References Cited

U.S. PATENT DOCUMENTS

| | | | |
|---|---|---|---|
| 3,487,879 A | 1/1970 | McCarthy et al. | |
| 3,873,654 A | 3/1975 | Smith | |
| 4,031,601 A | 6/1977 | Staub et al. | |
| 4,949,921 A | 8/1990 | Jarmon et al. | |
| 5,240,377 A | 8/1993 | Farr | |
| 5,279,892 A | 1/1994 | Baldwin et al. | |
| 5,403,153 A | 4/1995 | Goetze | |
| 5,518,385 A * | 5/1996 | Graff | B29C 70/48 425/127 |
| 8,109,734 B2 | 2/2012 | Backhouse | |
| 9,669,570 B2 * | 6/2017 | Godon | B29C 70/461 |
| 2008/0260536 A1 | 10/2008 | Beckford et al. | |
| 2009/0232647 A1 | 9/2009 | Henkle et al. | |
| 2009/0246446 A1 | 10/2009 | Backhouse | |
| 2011/0038732 A1 | 2/2011 | Huth et al. | |
| 2012/0171044 A1 | 7/2012 | Berard et al. | |
| 2012/0230829 A1 | 9/2012 | Benkler et al. | |
| 2016/0032939 A1 | 2/2016 | Anderson et al. | |
| 2018/0036914 A1 | 2/2018 | Marsal et al. | |
| 2018/0304562 A1 * | 10/2018 | Murakami | B29C 70/54 |

FOREIGN PATENT DOCUMENTS

| | | |
|---|---|---|
| EP | 2 105 579 A2 | 9/2009 |
| EP | 2 159 374 A2 | 3/2010 |
| EP | 2 327 538 A2 | 6/2011 |
| EP | 3 332 948 A1 | 6/2018 |
| GB | 871 066 A | 6/1961 |
| GB | 2119303 A | 11/1983 |
| GB | 2 410 458 A | 8/2005 |
| SB | 775816 A | 5/1957 |
| SB | 1 302 857 A | 1/1973 |
| SB | 2 244 453 A | 12/1991 |
| SB | 2 262 315 A | 6/1993 |
| WO | 2015/047511 A2 | 4/2015 |
| WO | 2017/126159 A1 | 7/2017 |

OTHER PUBLICATIONS

U.S. Appl. No. 16/277,420, filed Feb. 15, 2019 in the name of Gill.
Sep. 27, 2018 Search Report issued in British Patent Application No. 1805546.7.
Oct. 4, 2018 Search Report issued in British Patent Application No. 1805547.5.
Sep. 10, 2018 Search Report issued in British Patent Application No. 1803802.6.
May 15, 2020 Office Action Issued in U.S. Appl. No. 16/277,494.
Aug. 14, 2019 Search Report issued in European U.S. Appl. No. 19/157,125.
Aug. 23, 2019 Search Report issued in European Patent Application No. 19157127.2.
Aug. 23, 2019 Search Report issued in European Patent Application No. 19157128.0.

* cited by examiner

METHOD OF MANUFACTURING A FAN BLADE AND A FAN BLADE

CROSS-REFERENCE TO RELATED APPLICATIONS

This specification is based upon and claims the benefit of priority from UK Patent Application Number 1803802.6 filed on 9 Mar. 2018, and UK Patent Application Number 1805546.7 filed on 4 Apr. 2018 the entire contents of which are incorporated herein by reference.

BACKGROUND

Field of the Disclosure

The present disclosure relates to a method of manufacturing a fan blade for a gas turbine engine, and a fan blade of a gas turbine engine.

Description of the Related Art

It is known to provide fan blades comprising fibre reinforced composite materials for gas turbine engines. Such composite materials can provide a lightweight and strong fan blade structure. However, manufacturing such fan blades by known lay-up procedures can be time consuming and expensive.

SUMMARY

According to a first aspect, there is provided a method of manufacturing a fan blade for a gas turbine engine, the method comprising providing a compression mould having an internal mould surface corresponding to an outer profile of a fan blade; providing opposing first and second laminates to form a shell corresponding to the mould surface, each laminate comprising a lay-up of plies of fibre reinforcement material; applying a core material comprising quasi-isotropic short fibre reinforced resin in the compression mould so that with the compression mould in a moulding configuration the core material is enclosed by the shell, the core material and the shell forming a pre-form for the fan blade; applying pressure to compress the pre-form so that it conforms to the mould surface; and applying heat to cure the pre-form.

The method may comprise providing the first laminate on a first mould surface of a first mould part of the compression mould which defines a respective portion of the internal mould surface. The core material may be applied on the first laminate. The second laminate may be provided over the core material or on a second mould surface of a second mould part of the compression mould which defines a respective portion of the internal mould surface. The method may comprise assembling the first and second mould parts into the moulding configuration so that the core material is enclosed by the first and second laminates of the shell.

The method may comprise providing the first laminate on a first mould surface of a first mould part of the compression mould which defines a respective portion of the internal mould surface. The second laminate may be provided on a second mould surface of a second mould part of the compression mould which defines a respective portion of the internal mould surface. The method may comprise assembling the first and second mould parts into the moulding configuration so that a cavity is formed between the first and second laminates of the shell. Core material may be applied into the cavity after assembly of the compression mould.

Core material may be applied into the cavity only after assembly of the compression mould, such that the cavity is free of core material before assembly of the compression mould.

Providing the first laminate or the second laminate may comprise laying up plies of fibre reinforcement material on the internal mould surface of the compression mould.

The core material may be applied to extend from a terminal root end of the preform, corresponding to a root end of the fan blade, along a longitudinal extent of the pre-form. Accordingly, a root portion of the outer surface of a fan blade formed by the compression forming method may be (at least partially) defined by core material. In other words, the core of the fan blade may be exposed at the root end of the fan blade.

The method may comprise applying pressure to the core material at or through the root end with a piston, such that the core material drives the shell against the mould surface of the compression mould. The piston may apply direct pressure only to the core material.

The core material may be applied to define a tapered profile in a root region of the pre-form. The first and second laminates of the shell may be provided so that they have a substantially constant thickness in regions adjacent the core material. The viscosity of the core material may be lower than the viscosity of the first and second laminate material.

An initial quantity of core material may be applied in the compression mould before the compression mould is closed for forming. The initial volume may correspond to at least 50%, at least 75%, at least 85% or at least 90% of the volume inside the shell, when the shell conforms to the mould surface. The initial volume of the core material may be greater than 100% of the volume inside the shell.

By providing a relatively high proportion of the core material in the initial application, an amount of flow of the core material may be relatively limited during compression moulding. This may be advantageous in substantially maintaining the fibre orientation distribution (FOD) of the short fibres within the resin, such that the compression forming does not adversely affect the quasi-isotropic nature of the core material.

The core material may flow within the shell under pressure. Pressure may be applied or reacted at least partly by opposing action of first and second mould parts. A pressure-maintaining device may act on the core material to maintain pressure.

The pressure maintaining device may be a piston extending to or through the root end of the pre-form, or it may comprise a pressurised reservoir of core material outside the shell and in communication with the interior of the shell, for example through the root end of the pre-form. The pressure maintaining device may drive core material into the shell. The pressure maintaining device may permit core material to flow out of the shell, for example when there is excess core material in the compression mould after closing the mould.

According to a second aspect, there is provided a fan blade for a gas turbine engine comprising a core and a surrounding shell, wherein the core comprises quasi-isotropic short fibre reinforced resin, and the shell comprises a laminate comprising plies of fibre reinforcement material.

The core may extend from a terminal root end of the fan blade along a longitudinal extent of the fan blade, for example along a longitudinal extent corresponding to 10%, 25%, 50%, 75%, 90% or 100% of the fan blade. The core may define a tapered profile at a root portion of the fan blade.

The laminate shell may have a substantially constant thickness over the core.

The resin of the core and the resin of the shell may be continuous between the core and the shell, for example as a result of co-moulding. There may be no adhesive layer between the core and the shell. An interface region between the core and the shell may exhibit nesting of the resin of the core into undulations in the material of the shell, owing to the compression moulding process. There may be substantially no voids at an interface region between the core and the shell.

According to a third aspect, there is provided a fan blade in accordance with the second aspect, wherein the fan blade is manufactured in accordance with the first aspect, such that the core and shell are compression moulded and cured together.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disk or a bladed ring. Any suitable method may be used to manufacture such a bladed disk or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24, or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the accompanying Figures, in which.

DETAILED DESCRIPTION OF THE DISCLOSURE

Figure 1:
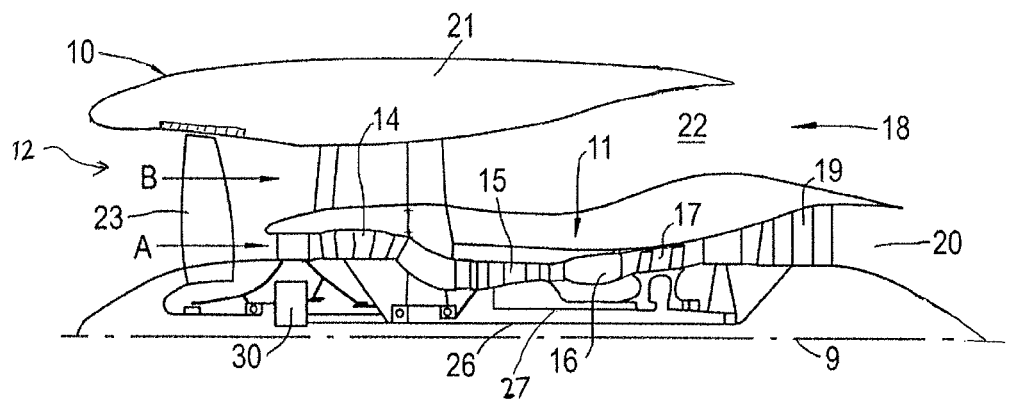
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
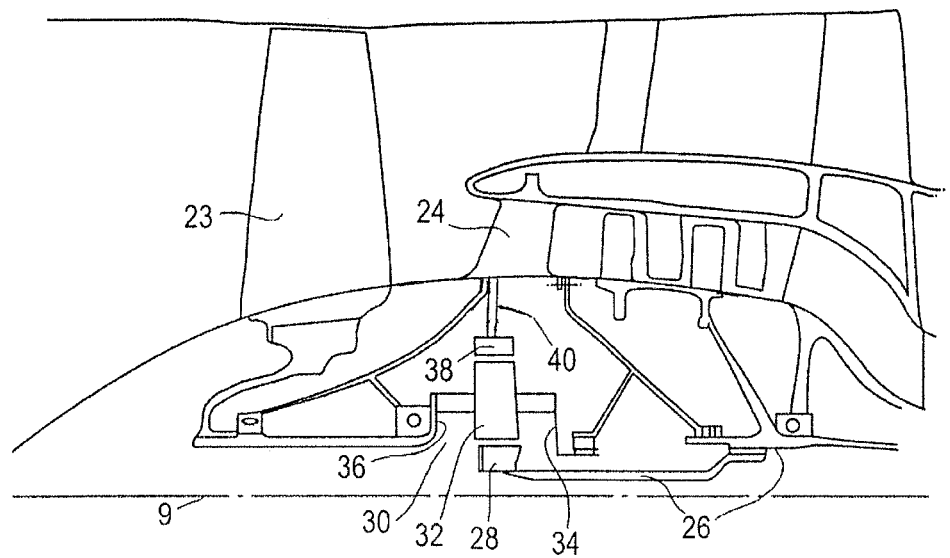
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
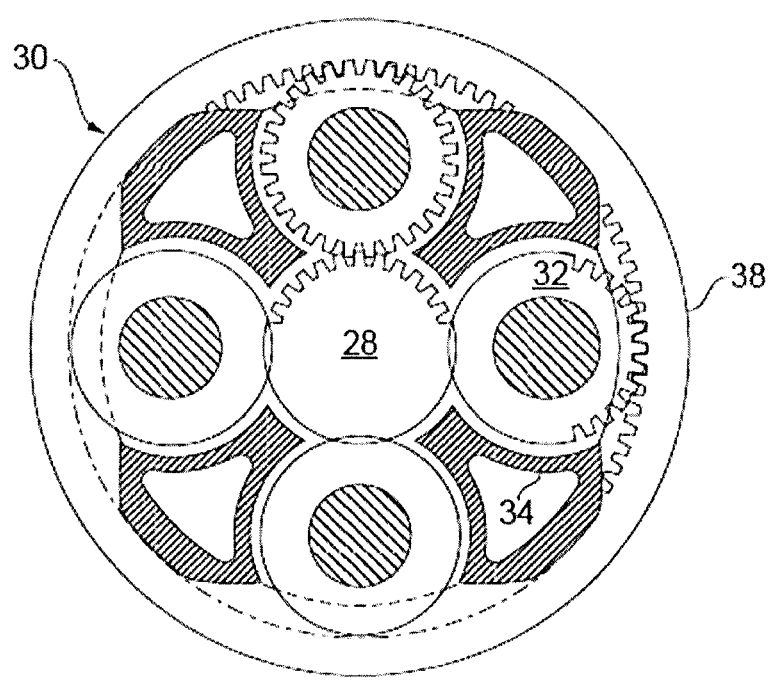
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
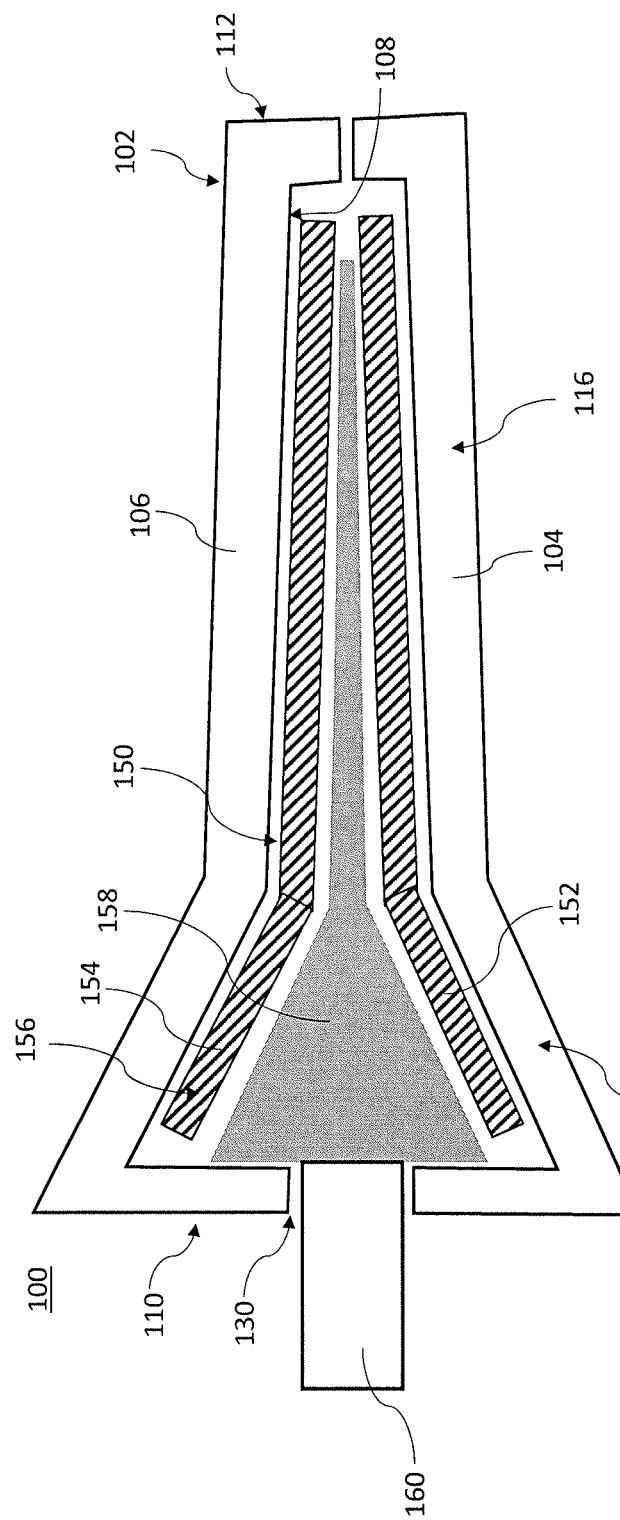
FIG. 4 schematically shows a sectional side view of a compression mould in a moulding configuration enclosing a fan blade preform.

FIG. 4 shows a sectional side view of a moulding apparatus 100 for manufacturing a fan blade for a gas turbine engine and a pre-form 150 for the fan blade enclosed within the moulding apparatus 100. The moulding apparatus 100 comprises a compression mould 102 having a first mould part 104 and a second mould part 106.

The compression mould 102 is in a moulding configuration in which the first mould part 104 and second mould part 106 are assembled and joined together. In this example, the compression mould 102 can be put into a lay-up configuration in which the first mould part 104 and the second mould part 106 are separated.

The first mould part 104 defines a first mould surface and the second mould part 106 defines a second mould surface. In the moulding configuration, the first mould surface and the second mould surface oppose one another so that the compression mould 102 defines an internal mould surface 108 corresponding to an outer profile of a fan blade.

The compression mould 102 extends from a root end 110, corresponding to a root end of the fan blade, along a longitudinal direction to a tip end 112 corresponding to a tip end of the fan blade. The mould surface 108 of the compression mould 102 defines a tapered profile in a root portion 114 of the compression mould 102. The tapered profile extends from the root end 110, partially along the longitudinal extent of the compression mould 102 and corresponds to a root of the fan blade by which the fan blade may be secured to a fan blade disk. In this example, the mould surface 108 at a blade portion 116 of the compression mould 102 tapers from the root portion 114 to the tip end 112 with a shallower angle than the taper of the root portion 114.

A pre-form 150 for a fan blade is enclosed within the compression mould 102. The pre-form 150 comprises a first laminate 152 and an opposing second laminate 154, the first and second laminates 152, 154 each comprising a lay-up of fibre reinforcement material. The first and second laminates 152, 154 together form a shell 156 within the compression mould 102 corresponding to the mould surface 108 of the compression mould 102. The pre-form 150 further comprises a core 158 comprising quasi-isotropic short fibre reinforced resin which is enclosed by the laminate shell 156.

Quasi-isotropic short fibre reinforced resin comprises a plurality of short fibres, for example carbon or glass fibres, embedded within a resin matrix. The short fibres are distributed within the matrix in a random orientation and therefore the reinforced resin exhibits quasi-isotropic properties i.e. exhibits almost isotropic properties.

The core 158 fills the shell 156. It extends from a terminal root end of the pre-form 150, corresponding to the root end 110 of the compression mould 102 and of the fan blade, along the longitudinal extent of the pre-form 150 to 95% of the total length of the fan blade, such that the core 158 extends through the blade portion 116. In other examples, the core may extend a lesser amount along the longitudinal extent of the pre-form, for example 50% of the total length of the fan blade (e.g. in a range of 50%-100% of the longitudinal extent of the fan blade). In this example, the first and second laminates 152, 154 have a substantially constant thickness along the longitudinal extent of the pre-form 150 in regions adjacent to the core 158. Correspondingly, the core 158 is configured to define a respective tapered portion from the root end in a root portion of the pre-form 150 which lies within the root portion 114 of the compression mould 102. In this example, the core 158 extends beyond the shell 156 at the root end of the pre-form 150. When cured, excess core 158 beyond the end of the shell 156 can be machined off until it is flush with the shell 156, to produce the finished fan blade 170 (shown in FIG. 6).

In other examples, the shell may be coterminous with the core at the root end of the compression mould, or may lie against a part of the root end 110.

The compression mould 102 comprises a port 130 in the root end 110 of the compression mould 102. The port 130 is configured to permit flow of the core 158 material out of the moulding apparatus 100 or into the moulding apparatus 100.

The moulding apparatus 100 further comprises a pressure maintaining device 160 at the port 130 of the compression mould 102. In this example, the pressure maintaining device 160 is in the form of a piston. In other examples, the pressure maintaining device may be in the form of a valve or a pressurised reservoir of core material in communication with the port 130. In this example, the piston 160 can selectively seal the port 130 and is configured to apply pressure to the core 158 during curing.

During forming in the moulding apparatus 100, the compression mould 102 encloses the pre-form 150 and the piston 160 applies pressure to the core 158 at the root end of the core 158, such that the core 158 material drives the shell 156 against the mould surface 108 of the compression mould 102. In use the piston 160 may project through the port 130 into the interior of the compression mould or may terminate upstream of the compression mould, for example within the port 130.

Figure 5:
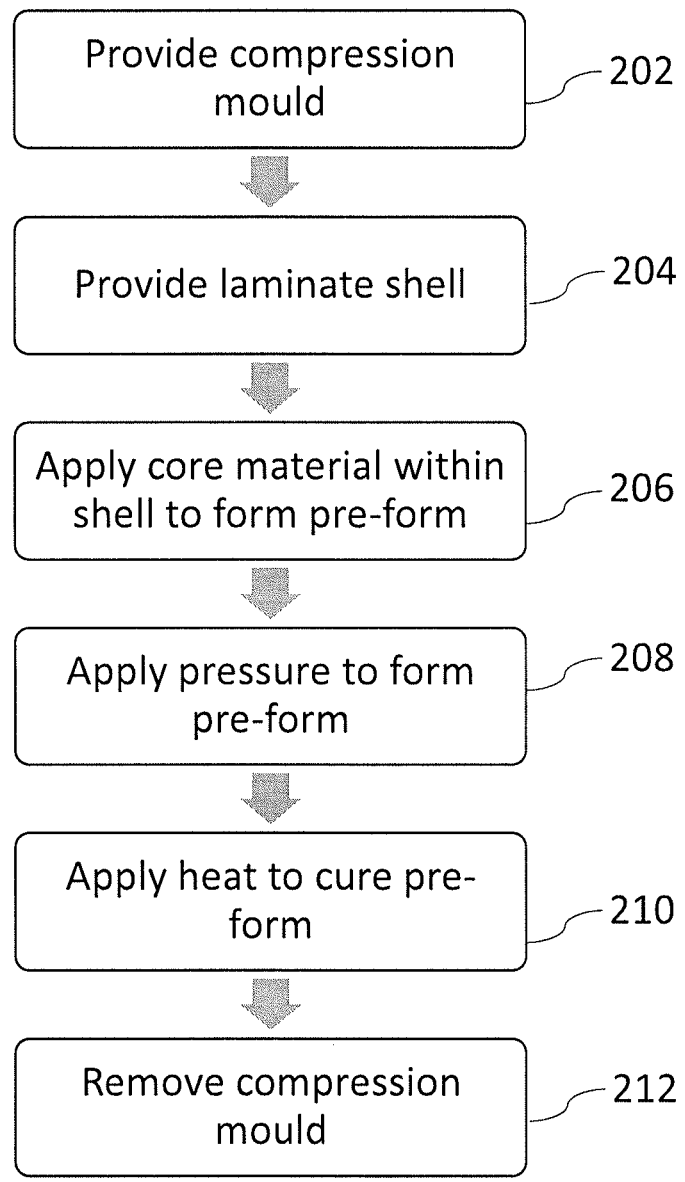
FIG. 5 is a flow chart of a method of manufacturing a fan blade for a gas turbine engine.

FIG. 5 is a flow chart showing an example method 200 of manufacturing a fan blade, which will be described by way of example with respect to the moulding apparatus 100 of FIG. 4.

In block 202, the compression mould 102 is provided and is configured to receive the pre-form 150. For example, the first and second mould parts 102, 104 may be separated so that fibre reinforcement material can be applied on the respective mould surfaces by an external apparatus. In block 204, a first laminate 152 and a second laminate 154 are provided comprising a lay-up of plies of fibre reinforcement material. In this example, the fibre reinforcement material is pre-impregnated with resin ("pre-preg"), but in other examples, it may be dry fibre, and resin may be transferred in a subsequent stage of the method, for example after initial application of the core material and before applying pressure, as will be described below. The first laminate 152 and second laminate 154 are provided within the compression mould 102 such that they form a laminate shell 156 having a profile corresponding to the mould surface 108 of the compression mould 102.

In block 206, core material is applied to provide a core 158 within the shell 156 so that they together define a pre-form 150 for the fan blade within the compression mould 102, as shown in FIG. 4. In this example, an initial quantity of core material comprising quasi-isotropic short fibre reinforced resin is applied in the compression mould 102 to form the core 158. The strength of the short fibre reinforced resin is determined by the fibre volume fraction, the fibre length distribution (FLD) and the fibre orientation distribution (FOD) of the short fibres within the resin. Therefore, the core material can be selected at a predetermined strength for specific purposes by selecting an appropriate fibre volume fraction, fibre length distribution and fibre orientation distribution.

Core material is applied so that the core 158 extends from a terminal root end of the pre-form 150 corresponding to a root end 110 of the compression mould 102 and of the fan blade, along a longitudinal extent of the pre-form 150. The core material is applied to define a tapered profile from the terminal root end, in the root portion of the pre-form 150 which lies within the root portion 114 of the compression mould 102. The core material is applied so that the core 158 is enclosed by the shell 156. The core 158 of the pre-form is exposed at the root end of the pre-form 150 to the port 130 of the compression mould 102. Therefore, the core material is applied such that the piston 160 can directly apply pressure to the core 158 during forming.

In this example, the initial quantity of core material is applied in the compression mould 102 before the mould parts are assembled together in the moulding configuration. In this example, the initial quantity of core material corresponds to approximately 110% of the final volume of core material in the fan blade, and is applied to be in largely the right shape for the fan blade. Therefore, during forming, there may be flow of core material to fill the shell, and a flow of core material out of the port 130. In other examples, the initial quantity of core material may be lower or less than 100% of the final volume of core material. For example, it may be approximately 90% of the final volume of core material in the fan blade. In some examples, it may therefore be necessary to introduce more core material through the port 130 before forming.

In block 208, pressure is applied to form the pre-form 150. Typically, a pressure of 5000 kPa is applied to the pre-form. In this example, pressure is applied to the pre-form 150 by opposing action of the first mould part 104 and the second mould part 106, and by action of the piston 160 against the core 158. When pressure is applied to the pre-form 150 by opposing action of the first mould part 104 and second mould part 106, core material may be driven against the piston 160 through the port 130 of the compression mould 102. The piston 160 may apply pressure to the core material at the root end of the pre-form 150 so that the core material drives the laminate shell 156 against the mould surface 108 of the compression mould 102. Some core material may flow through the port 130.

In this example, the piston 160 applies a pressure of approximately 5000 kPa directly to the core 158 at the root end of the pre-form 150. The piston 160 applies direct pressure only to the core 158 to ensure that core material transfers the pressure evenly to the shell 156. In other examples, there may be no pressure maintaining device at all, or the pressure maintaining device may be in the form of a valve which only permits flow of the core material out of the compression mould 102 when the core 158 is at a predetermined pressure. In yet other examples, the pressure maintaining device may be in the form of a pressurised reservoir of core material in communication with the interior of the compression mould 102.

Flow of the core material within the compression mould 102 may change the fibre orientation distribution of the core 158 by shear flow of the core material. This may change the properties of the core material, which may have been selected for a specific application. By providing a volume of core material in the initial application which is relatively close to the final volume of core material (for example at least 75%, or at least 90% by volume), an amount of flow of the core material may be relatively limited during compression moulding. This may be advantageous in substantially maintaining the fibre orientation distribution (FOD) of the short fibres within the resin, such that the compression forming does not adversely affect the quasi-isotropic nature of the core material.

In this example, the viscosity of the core material is lower than the viscosity of the first and second laminate material. Having a quasi-isotropic short fibre reinforced resin with a relatively high viscosity minimizes the flow of the material in order to preserve the fibre orientation distribution, and therefore the isotropic properties of the core material.

In block 210, heat is applied to cure the pre-form for example by heating the apparatus 100 directly or placing it in an oven or autoclave. In block 212, the fan blade has been formed and the compression mould 102 is removed by separating the first mould part 104 and the second mould part 106 to release the formed component. In other examples, the compression mould may be removed by breaking open the first or second mould part. The formed component may require machining to finish the fan blade.

Figure 6:
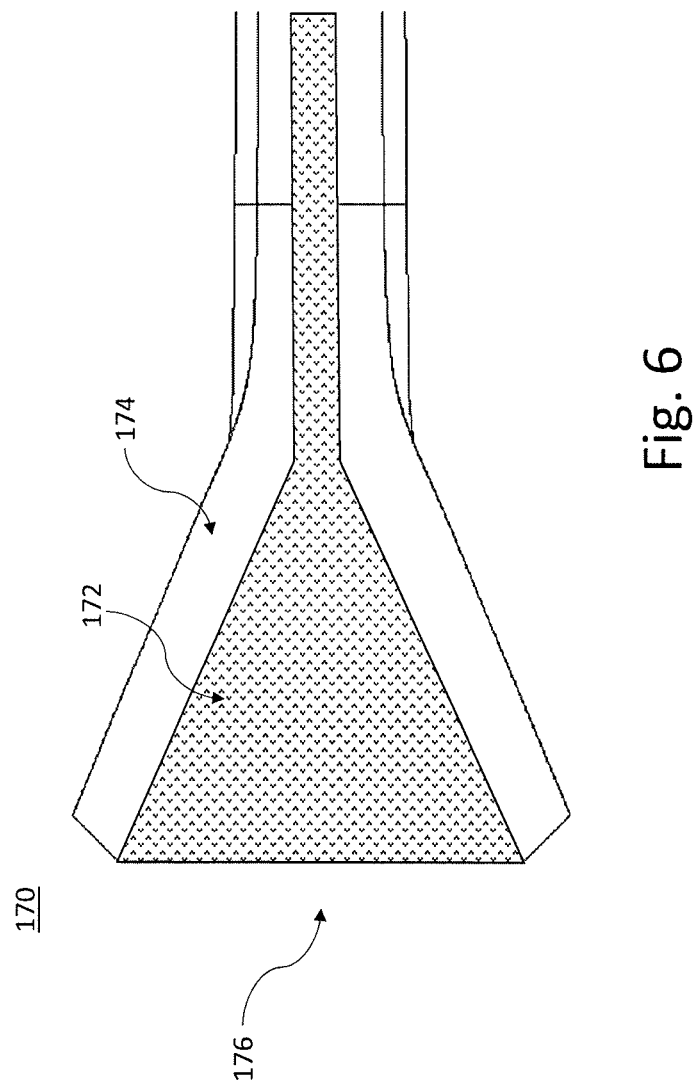
FIG. 6 schematically shows a sectional side view of a portion of a fan blade manufactured with the compression mould of FIG. 4.

FIG. 6 schematically shows a portion of a finished fan blade 170 after manufacturing in a process as described with reference to FIG. 5. The fan blade 170 comprises a core 172 of quasi-isotropic short fibre reinforced resin, surrounded by a shell 174 of plies of fibre reinforced resin. The core 172 extends from a terminal root end 176 along a longitudinal extent of the fan blade 170 and defines a tapered profile from the terminal root end 176 of the fan blade 170. The shell 174 has a substantially constant thickness in regions adjacent the core 172.

In this example, there is no adhesive layer between the core 172 and the shell 174. The resins of the core and the shell are continuous between the core 172 and the shell 174 and therefore, the core 172 and shell 174 are joined together by resin which is continuous across an interface between the core 172 and the shell 174. Therefore, there is no requirement for further adhesive. An interface region between the core 172 and the shell 174 exhibit nesting of the resin of the core 172 into undulations in the material of the shell 174, due to the compression moulding process. Therefore, there may be substantially no voids at the interface region between the core and the shell 174.

Figure 7:
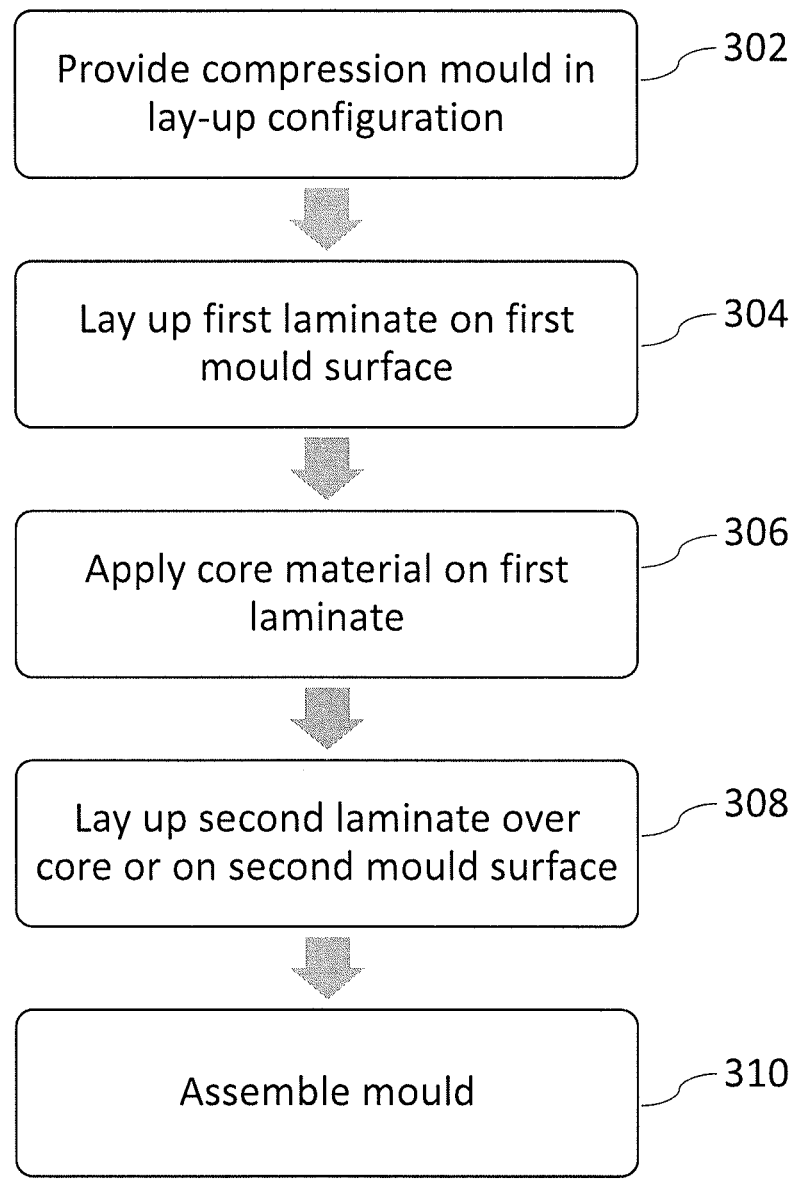
FIGS. 7 and 8 are flow charts of examples methods of manufacturing a fan blade for a gas turbine engine.

FIG. 7 is a flow chart showing an example method 300 which is a variant of blocks 202 to 206 of FIG. 5.

In block 302 the compression mould 102 is provided in a lay-up configuration, in which the first mould part 104 and the second mould part 106 are separate, so that at least one of the first and second mould surfaces is easily accessible for laying-up fibre reinforcement material.

In block 304, plies of fibre reinforcement material are laid up on the first mould surface of the first mould part 104 of the compression mould 102 to form the first laminate 152. In block 306, core material is applied on the first laminate 152 to form the core 158. In block 308, plies of fibre reinforcement material are laid up over the core 158 or on the second mould surface of the second mould part 106 of the compression mould 102 to form the second laminate 154.

In block 310 the first mould part 104 and the second mould part 106 are assembled to form the compression mould 102 in the moulding configuration and enclosing the pre-form 150 as shown in FIG. 4.

The method is then continued from block 208 as described above in FIG. 5.

Figure 8:
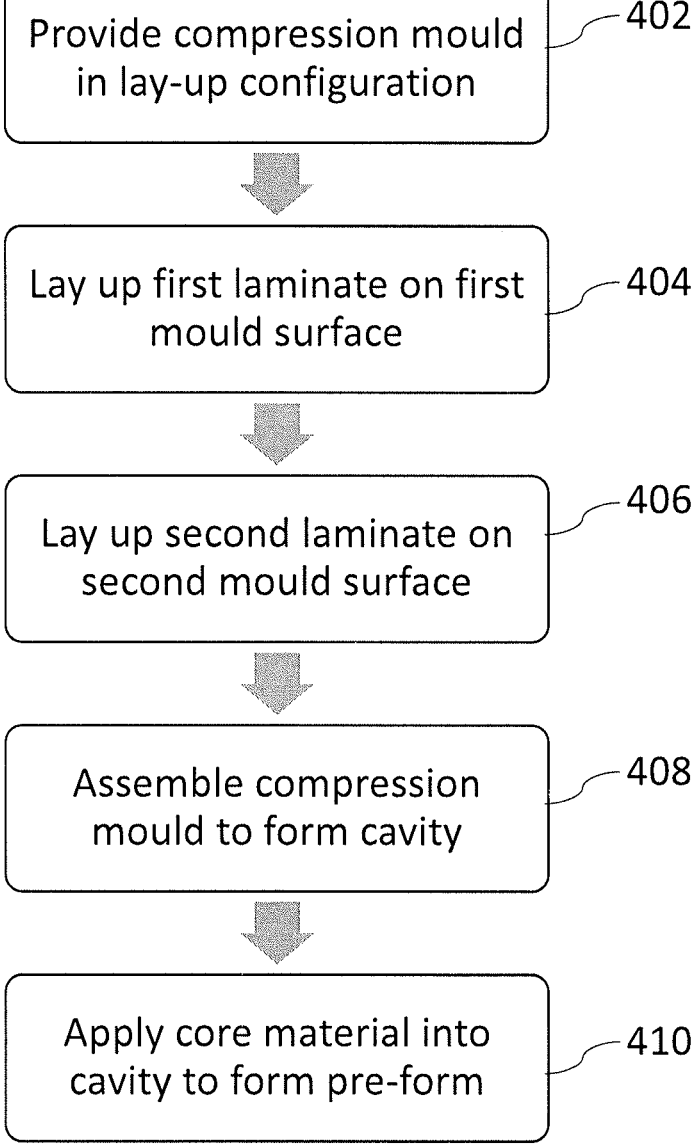

FIG. 8 is a flow chart showing a method 400 which is a further variant of blocks 202 to 206 of FIG. 5.

In block 402 the compression mould 102 is provided in a lay-up configuration, in which the first mould part 104 and the second mould part 106 are separate, so that at least one of the first and second mould surfaces is easily accessible for laying-up material.

In block 404 plies of fibre reinforcement material are laid up on the first mould surface of the first mould part 104 of the compression mould 102 to form the first laminate 152. In block 406 plies of fibre reinforcement material are laid up on the second mould surface of the second mould part 106 of the compression mould 102 to form the second laminate 154. In block 408 the first and second mould parts 104, 106 are assembled to form the compression mould 102, so that a cavity is formed between the first laminate 152 and the second laminate 154.

In block 310 core material is applied into the cavity to form the pre-form 150 only after assembly of the compression mould 102 in the moulding configuration.

In these examples, the first and second laminates 152, 154 are laid up so that they have a substantially constant thickness along a longitudinal extent in regions adjacent to the core 158. In other examples, the first and second laminate may have a varying thickness along a longitudinal extent.

Laying up plies is a time consuming process which is often done manually or otherwise requires significant control procedures to be defined. By replacing a portion of the lay-up with a bulk core material of quasi-isotropic short fibre reinforced resin, the time taken and manual/control effort to manufacture a fan blade may be considerably reduced without adversely affecting blade performance. There may be a trade-off between manufacturing efficiency benefits and the overall strength of the fan blade when cured, as the quasi-isotropic short fibre reinforced resin may have a lower strength than the laminates forming the shell. In particular, the laminates may be formed of unidirectional fibre reinforcement material having better structural performance than the quasi-isotropic short fibre reinforced resin.

The applicant has found that stress patterns in a fan blade are such that high stress regions are generally located towards the surface of the fan blade, and lower stress regions are located towards the core. Therefore, the applicant has found that the manufacturing of a fan blade can benefit from the efficiencies of using quasi-isotropic short fibre reinforced resin material without compromising structural integrity by providing a quasi-isotropic short fibre reinforced resin core with a laminate shell, For example by providing that the core within the root region is no more than 50% of the thickness of the root, and the core within the blade portion is no more than 30% of the thickness of the blade portion.

Further reinforcement of an interface between the core and the first and second laminates may be achieved by z-pinning, stitching, tufting, or interlayer particle/veil toughening.

Furthermore, providing a core with a bulk material which can easily be deformed allows the laminates to be laid up with a substantially constant thickness in areas adjacent to the core material, and for variations in the fan blade thickness to be accommodated by the core. This further simplifies the process of manufacturing the fan blade as it is not necessary to build up a variable thickness profile by selectively applying plies.

Although it has been described that the compression mould is provided in the lay-up configuration, in other examples, the compression mould may already be provided in the moulding configuration, or may be provided as a unitary body, and the plies of fibre reinforcement material may be laid up on the mould surface of the compression mould when in the moulding configuration, for example by an internal applicator.

Although it has been described that the first and second laminates are laid up on the compression mould or over the core, in other examples, the laminates may be laid up elsewhere, and subsequently placed on the first or second mould surface of the first or second mould part respectively, or may be placed within the compression mould in the moulding configuration.

Although examples have been described in which core material is un-cured when it is applied, in other examples the core may be pre-formed in a separate pressing operation to bring it closer to the desired geometry. This operation may be combined with heat to partially cure the core, and thereby limit its flow in subsequent operations.

Although it has been described that the example methods are carried out using the moulding apparatus 100 described with reference to FIG. 4, any suitable moulding apparatus may be used.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a fan blade for a gas turbine engine, the method comprising:
    providing a compression mould having an internal mould surface corresponding to an outer profile of a fan blade;
    providing opposing first and second laminates to form a shell corresponding to the mould surface, each laminate comprising a lay-up of plies of fibre reinforcement material;
    applying a core material comprising quasi-isotropic short fibre reinforced resin in the compression mould so that with the compression mould in a moulding configuration the core material is enclosed by the shell, the core material and the shell forming a pre-form for the fan blade;
    applying pressure to compress the pre-form so that it conforms to the mould surface; and
    applying heat to cure the pre-form,
    wherein the pre-form includes a root portion and a blade portion, and the core material within the root portion is no more than 50% of the thickness of the root portion, and the core material within the blade portion is no more than 30% of the thickness of the blade portion.

2. The method according to claim 1, wherein the method comprises:
    providing the first laminate on a first mould surface of a first mould part of the compression mould which defines a respective portion of the internal mould surface, wherein the core material is applied on the first laminate;
    providing the second laminate over the core material or on a second mould surface of a second mould part of the compression mould which defines a respective portion of the internal mould surface; and
    assembling the first and second mould parts into the moulding configuration so that the core material is enclosed by the first and second laminates of the shell.

3. The method according to claim 1, wherein the method comprises:
    providing the first laminate on a first mould surface of a first mould part of the compression mould which defines a respective portion of the internal mould surface;
    providing the second laminate on a second mould surface of a second mould part of the compression mould which defines a respective portion of the internal mould surface;
    assembling the first and second mould parts into the moulding configuration so that a cavity is formed between the first and second laminates of the shell; and
    wherein core material is applied into the cavity after assembly of the compression mould.

4. The method according to claim 1, wherein providing the first laminate or the second laminate comprises laying up plies of fibre reinforcement material on the internal mould surface of the compression mould.

5. The method according to claim 1, wherein the core material is applied to extend from a terminal root end of the preform, corresponding to a root end of the fan blade, along a longitudinal extent of the pre-form.

6. The method according to claim 5, comprising applying pressure to the core material at or through the root end with a piston, such that the core material drives the shell against the mould surface of the compression mould, and optionally wherein the piston applies direct pressure only to the core material.

7. The method according to claim 1, wherein the core material is applied to define a tapered profile in the root portion of the pre-form.

8. The method according to claim 1, wherein the first and second laminates of the shell are provided so that they have a substantially constant thickness in regions adjacent the core material.

9. The method according to claim 1, wherein the viscosity of the core material is lower than the viscosity of the first and second laminate material.

10. The method according to claim 1, wherein an initial quantity of core material is applied in the compression mould before the compression mould is closed for forming, and wherein the initial volume corresponds to at least 90% of the volume inside the shell when the shell conforms to the mould surface.

11. The method according to claim 1, wherein the core material flows within the shell under pressure.

12. The method according to claim 1, wherein pressure is applied at least partly by opposing action of first and second mould parts, and wherein a pressure-maintaining device acts on the core material to maintain pressure.

13. The method according to claim 12, wherein the pressure maintaining device drives core material into the shell, or wherein the pressure maintaining device permits core material to flow out of the shell.

14. The fan blade for a gas turbine engine comprising a core and a surrounding shell, wherein the core comprises a quasi-isotropic short fibre reinforced resin, and the shell comprises laminate comprising plies of fibre reinforcement material, and wherein the fan blade is manufactured in accordance with claim 1, such that the core and shell are compression moulded and cured together.

15. A fan blade for a gas turbine engine comprising a core and a surrounding shell, wherein the core comprises a quasi-isotropic short fibre reinforced resin, and the shell comprises laminate comprising plies of fibre reinforcement material,
wherein the fan blade includes a root portion and a blade portion, and the core material within the root portion is no more than 50% of the thickness of the root portion, and the core material within the blade portion is no more than 30% of the thickness of the blade portion.

16. The fan blade according to claim 15, wherein the core material extends from a terminal root end of the fan blade along a longitudinal extent of the fan blade.

17. The fan blade according to claim 15, wherein at least one of (i) the core defines a tapered profile at the root portion of the fan blade, and (ii) the laminate shell has a substantially constant thickness through the fan blade.

18. The fan blade according to claim 15, wherein the resin of the core and the resin of the shell is continuous between the core and the shell.

19. The fan blade according to claim 15, wherein there is no adhesive layer between the core and the shell.

20. The fan blade according to claim 15, wherein there are substantially no voids at an interface region between the core and the shell.

* * * * *